United States Patent [19]

Motoki

[11] Patent Number: 5,146,065
[45] Date of Patent: Sep. 8, 1992

[54] CART

[75] Inventor: Shigeru Motoki, Mitaka, Japan

[73] Assignee: Jamco Corporation, Tokyo, Japan

[21] Appl. No.: 731,237

[22] Filed: Jul. 17, 1991

[30] Foreign Application Priority Data

Jul. 25, 1990 [JP] Japan .................... 2-195003

[51] Int. Cl.⁵ ............................. F27D 11/02
[52] U.S. Cl. ................... 219/386; 219/521
[58] Field of Search ............. 219/385, 386, 387, 521

[56] References Cited

U.S. PATENT DOCUMENTS

| | | | |
|---|---|---|---|
| 3,908,749 | 9/1975 | Williams | 219/386 |
| 3,924,100 | 12/1975 | Mack | 219/386 |
| 4,019,022 | 4/1977 | Seider | 219/386 |
| 4,103,736 | 8/1978 | Colato | 219/521 |
| 4,167,983 | 9/1978 | Seider | 219/386 |
| 4,285,391 | 8/1981 | Bourner | 219/386 |
| 4,584,466 | 4/1986 | de Mola | 219/386 |
| 5,003,159 | 3/1991 | Thorson | 219/386 |

*Primary Examiner*—Teresa J. Walberg
*Attorney, Agent, or Firm*—Armstrong, Nikaido, Marmelstein, Kubovcik & Murray

[57] ABSTRACT

An electricity supply device, connected to an electric contact of a heater on a tray, is disposed on the side wall at the upper part of a support member which supports and guides a tray and which is formed on the side wall of a receiving chamber. The electricity supply device has a) a conductive plate spring placed in pressure contact with an electric contact of a heater and b) a conductive pin connected to a power source and is embedded into a plastic mold. The plastic mold is disposed into a casing which is mounted to the side wall of the receiving chamber to secure an insulating property. The plate spring makes positive contact with a contact of the heater.

5 Claims, 5 Drawing Sheets

FIG. 7
FIG. 8
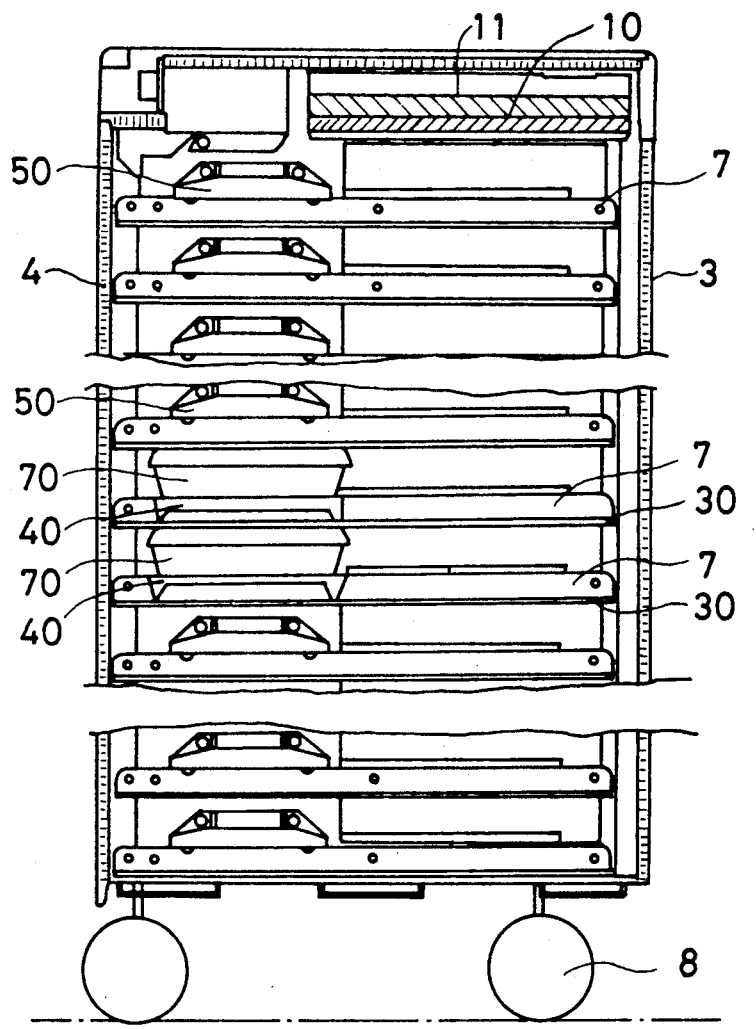
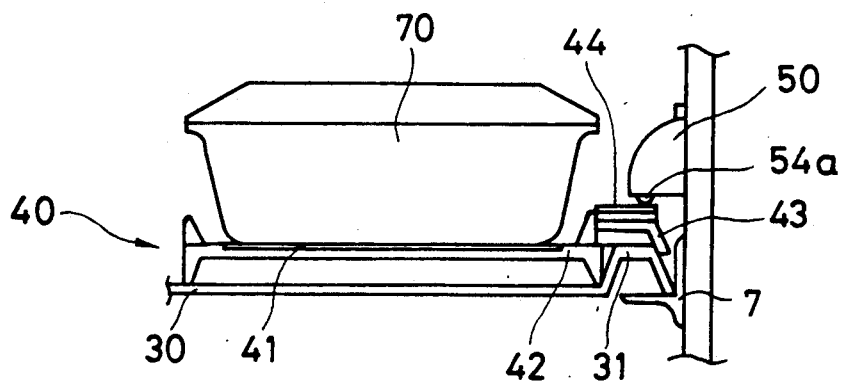

CART

FIELD OF THE INVENTION

The present invention relates to a cart which receives, stores and carries trays (meal supply trays) with flatware placed thereon for meal service in an airplane to seated passengers or for meal service to patients in a hospital. More particularly, the invention relates to a cart provided with a heating device and particularly to an improvement in an electric supply means to the heating device.

DESCRIPTION OF THE PRIOR ART

In serving meals in an airplane, a hospital and the like, trays with dishes placed thereon are carried by a cart. There is employed a system which comprises placing flatware with the cold dish or hot dish on trays (meal supply trays) in advance, receiving these trays in a cart, and storing the cart in a galley or the like until meal time.

In a cart of this kind, it has been necessary to keep the cold dish on the tray cold and the hot dish hot. Such devices are disclosed, for example, in Japanese Patent Publication Nos. 26413/1981 and 47117/1983 publications. However, the cold dishes placed on these carts are affected by the heat from the heating device for keeping the hot dishes hot, and the temperature of the cold dishes inconveniently rises. It has been difficult to maintain the interior of the tray receiving chamber at uniform temperature distribution.

In view of the foregoing, the present applicant has previously proposed, in Japanese Utility Model Laid-Open No. 108240/1989, a cart which is designed so that only the hot dish is heated and flatware for the cold dish can be effectively cooled while maintaining the interior of the receiving chamber in a cooled state. In this cart, a heat generating plate is provided at each location where the hot dishes are placed on the trays and the heat generating plate is heated by being connected to an electricity supply device within the cart.

However, the conventional electricity supply device has employed a divisional construction, making it inconveniently difficult to manufacture the device.

SUMMARY OF THE INVENTION

The present invention provides a cart which is highly effective in keeping cool items and keeping hot items within the cart and which can keep a uniform room temperature by using an electricity supply device which is easy to manufacture and high in reliability of connection.

The cart according to the present invention comprises a body formed with a receiving chamber for receiving trays on which dishes are placed. Support members support and guide trays formed in plural stages on both side walls of the receiving chamber. A casing is formed integral with a conductive member receiving recess and a mounting plate which mounts an electricity supply device to the side wall of the receiving chamber at the upper part of the support members. An insulating molded plastic is fitted in the conductive member receiving recess. The electricity supply device comprises conductive pins embedded in the molded plastic and conductive plate springs having one end connected to the conductive pin and the other end formed with a curved portion in contact with a heat generator. Trays with a heat generator have an electric contacts connected to the electricity supply device placed thereon.

The electricity supply device for the cart thus constructed is fitted in the casing formed integral with the molded plastic of an insulating body with the conductive members embedded therein, which is simple in structure, easy to manufacture, simple in handling and positive in insulating property. In addition, when the tray with a heater placed thereon is received into the receiving chamber, the curved portion of the conductive member receiving recess of the electricity supply device resiliently comes into contact with the contact point of the heater.

BRIEF DESCRIPTION OF THE DRAWINGS

FIG. 7 is a plan view of a receiving chamber of the cart; and

FIG. 8 is an explanatory view for the relationship between the electricity supply device and the heater.

DETAILED DESCRIPTION OF THE PREFERRED EMBODIMENTS

Embodiments of the present invention will now be described in detail with reference to the drawings.

Figure 1:
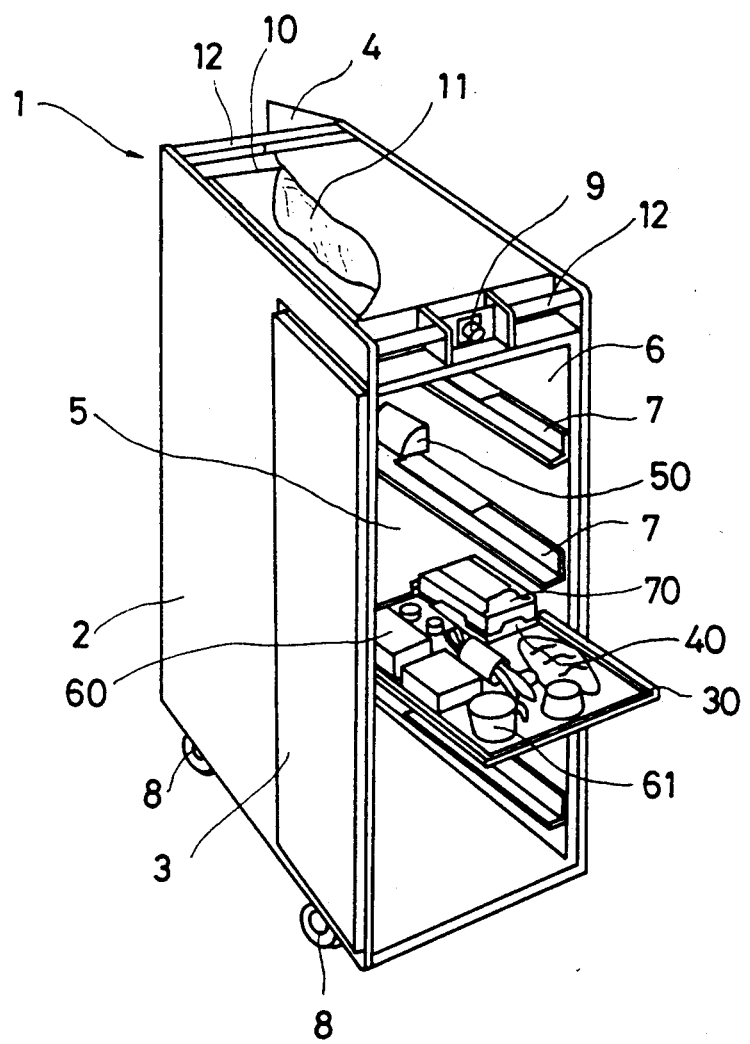
FIG. 1 is a perspective view of a cart according to the present invention.

FIG. 1 shows the whole cart according to the present invention. A body 1 of the cart is formed into a box-shape by both side walls 2 formed by a heat insulating plate, a front door 3, a rear door 4, a floor and a ceiling surface. The cart is interiorly formed with a receiving chamber 5 for receiving trays 30 with dishes placed thereon. The front door 3 and the rear door 4 are open- and closably mounted on the front surface and the rear surface, respectively, of the side wall 2. A base plate 6 having an electric circuit is installed on the side wall 2 of the receiving chamber 5. A plurality of support members 7 for supporting and guiding trays are disposed in parallel in a horizontal direction on the inner surfaces of the side walls 2. The support member 7 comprises a lengthy member having a ]-shape in section and secured to the side wall 2 by means of a fastener 71 (see FIG. 5). An electricity supply device 50 is mounted on the upper side wall of the support member 7. Two electricity supply devices 50 are provided in a row between the front door 3 and rear door 4, respectively, or one is provided on either side of the front door 3 or rear door 4. The support member 7, at a position where the electricity supply device 50 is mounted, is in the shape of an L formed by cutting the upper horizontal of a ]-shaped member. The electricity supply device 50 feeds power to a heater 40 on the tray 30 in the mode described later. A power source connector 9 is provided on the upper front side of the body 1. When this connector 9 is connected to an electric cord (not shown), power is supplied to the electricity supply device 50 through the base plate 6. A shelf plate 10 for receiving dry ice 11 is disposed at the uppermost portion of the receiving chamber 5 so that cool air flows down through the space between the front door 3, the rear door 4 and the tray 30. Wheels 8 are mounted on the lower surface of the body 1, and a handle 12 mounted on the upper portion of the body 1 making it easy to handle the cart.

Figure 2:
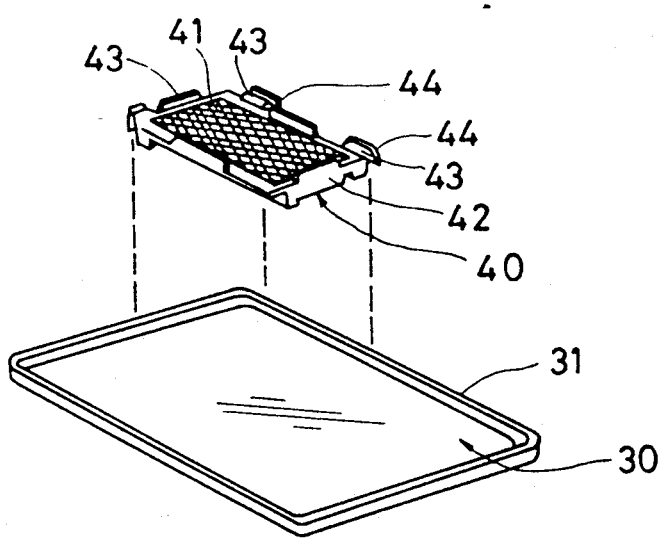
FIG. 2 is a perspective view of a tray and a heater.

FIG. 2 shows the detail of the tray 30. The tray 30 is received into the receiving chamber 5 of the cart in the state where both longitudinal side edges of the tray 30 are supported on the support members 7 on both sides of the receiving chamber 5. The tray 30 is provided on the peripheral edge thereof with a vertically standing frame plate 31, and an underlay plate type heater 40 is placed on the tray 30. The heater 40 comprises a heat generating plate 41 with a heat generating body having a substantially rectangular shape in plane embedded therein and a holding frame 42 composed of a heat insulating body on which the heat generating body 42 is placed. The lower surface of the heater 40 has a raised bottom so as to form a clearance between the heater 40 and the tray 30 surface when it is placed on the tray. Two locating ]-shaped mounting metallic parts 43 are disposed in a spaced relationship in a longitudinal direction of the holding frame 42, and one metallic part 43 is disposed on the short side thereof. The metallic part 43 engages the frame plate 31 of the tray 30 to locate the heater 40 to a fixed position of the tray 30. The engagement between the metallic part 43 mounted on the short side of the holding frame 42 and the frame plate 31 holds the mounting state against the contact resistance with the electricity supply device 50 when the tray is inserted while being guided by the support members 7. A cam type contact 44 is mounted on each of two mounting metallic parts 43 provided on the long side of the holding frame 42. The upper surface of contact 44 acts as a cam to press curved portion 54a upward. The contact 44 is electrically connected to a heat generating body of the face-like heat generating plate 41.

The contact 44 of the heater 40 on the tray 30 comes into contact with the electricity supply device 50 disposed at the upper part of the support member 7 when the tray 30 is guided by the support member 7 and forced into the receiving chamber 5.

Figure 3:
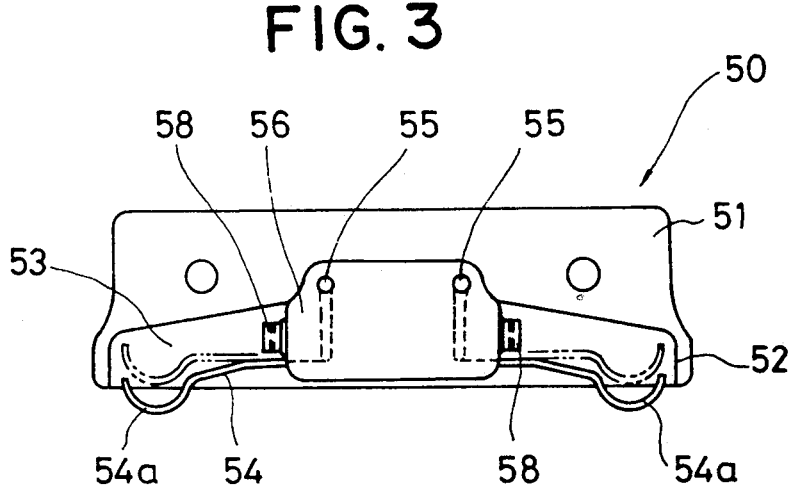
FIG. 3 is a perspective view of an electricity supply device.
Figure 4:
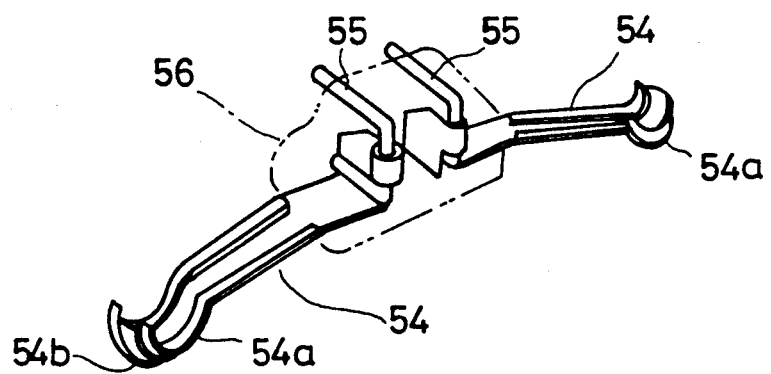
FIG. 4 is a perspective view of a conductive member.
Figure 5:
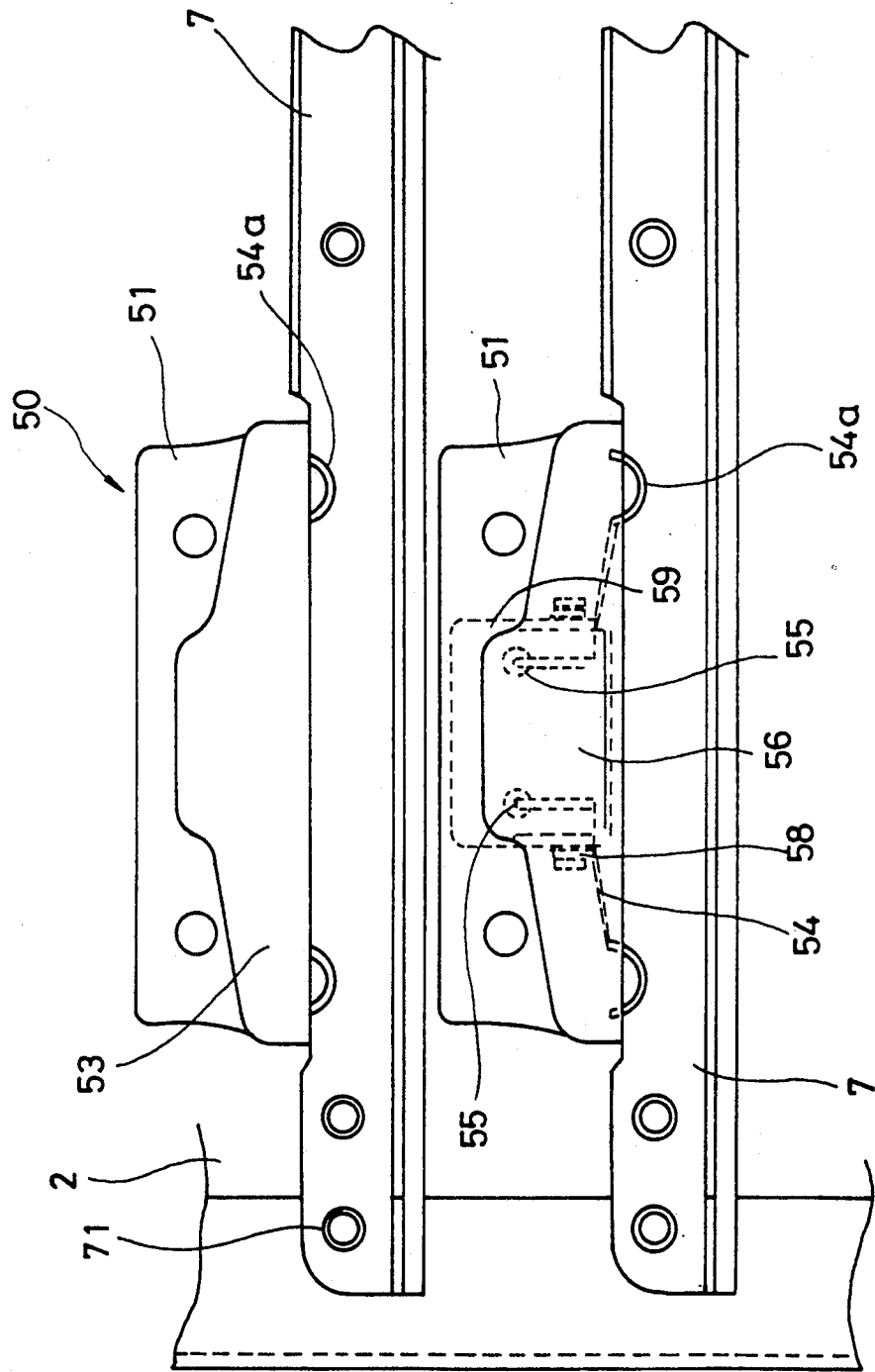
FIG. 5 is a partly enlarged view of a receiving side wall.
Figure 6:
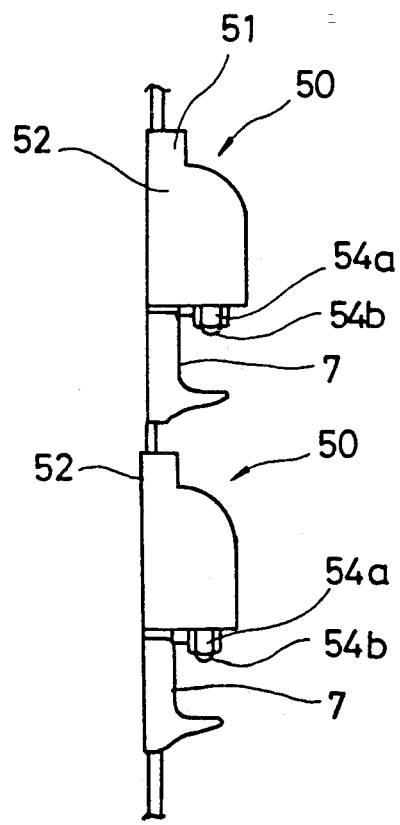
FIG. 6 is a side view of FIG. 5.

The construction of the electricity supply device 50 will be described with reference to FIGS. 3 to 8. FIG. 3 is a rear view of the electricity supply device 50, FIG. 4 is a perspective view of a conductive member, FIG. 5 is a partly enlarged view of the receiving side wall in which the electricity supply device 50 is mounted at the upper part of the support member 7, FIG. 6 is a side view of FIG. 5, FIG. 7 is a plan view of a receiving chamber with the trays 30 received therein, and FIG. 8 is a detailed view of a connection portion with a contact.

The electricity supply device 50 is disposed at the upper part of the support member 7 and at a position in contact with the pantograph type contact 44 of the heater 40 on the tray 30. The electricity supply device 50 comprises a synthetic resin casing 52 formed with a conductive member receiving recess 53 having a flat plate-mounting plate 51 recessed and a conductive member received into the conductive member receiving recess 53. The casing 52 is integrally molded. A molded plastic 56 with a conductive member embedded therein is fitted in the central portion of the conductive member receiving recess 53. As shown in FIG. 4, the conductive member comprises two conductive pins 55 formed into a ]-shape by perpendicularly bending both ends of a rod-like pin formed from a conductive member, and two conductive and resilient plate springs 54 disposed symmetrically to the left and right sides at right angles with respect to the conductive pins 55. The plate spring 54 comprises a narrow web-like plate, which has a convex portion 54b whose central width portion is in a convex form over the full length thereof and is provided with a curved portion 54a obtained by curving the extreme end into a substantially semicircular shape, the other end portion being bent at a right angle. Perpendicular bent ends of two pins 55 are secured by means such as soldering to the bent portion of the plate spring 54 to connect the pin 55 and the plate spring 54. The pin 55 and the plate spring 54 portion bent perpendicularly are embedded into the substantially square insulating molded 56. The extreme end of the pin 55 is exposed to one surface of the plastic mold 56. The plastic mold 56 is fitted into the conductive member receiving recess 53 with the side on which the conductive pin 55 of the molded plastic 56 is exposed directed at the open surface of the casing 52. The molded plastic 56 with the conductive member embedded therein is held by a rod 58 with both side ends placed on the casing 52 and mounted in the conductive member receiving recess 53. The upper surface on the side in which the conductive pin 55 of the plastic mold 56 is exposed is covered with an insulating sheet 59 formed of an plastic material having an insulating property. The insulating sheet 59 is formed with a through-hole at a position corresponding to the pin 55 so that when the molded plastic 56 is covered with the insulating sheet 59, the extreme end of the pin 55 can appear from the through-hole.

With the above-described arrangement, the bent portion of the plate spring 54 in the recess 53 fixed by the molded plastic 56 cannot be moved. However, the plate spring 54 including the curved portion 54a exposed from the molded plastic 56 in the recess 53 is raised upwardly as indicated by the dash-dotted contour lines in FIG. 3 when an upward force is applied thereto from the bottom.

In the thus configured electricity supply device 50, the mounting plate 51 of the casing 52 is mounted by a fastener 71 or the like at the upper part of the support member 7 close to the rear door 4 within the receiving chamber 5 of the cart in the state where the insulating sheet 59 surface is placed in contact with the side wall 2 surface of the receiving chamber 5. The exposed conductive pin 55 of the electricity supply device 50 comes into contact with the circuit of the base plate 6 disposed on the side wall 2, and the base plate 6 is connected to the power source connector 9 capable being connected to the power source. The electricity supply device 50 is arranged so as to be positioned above the mounting metallic part 43 of the heater 40 of the inserted and installed tray 30. With this, when the tray 30 with dishes placed thereon is received, the curved portion 54a of the plate spring 54 comes into resilient contact with the contact 44 of the heater 40.

Next, the cooling and heating functions of the cart will be described.

For example, meals to be served in an airplane or a hospital are carried to a table of each seat in the state where dishes 60 for a sub-meal (cold dish) such as salad and a dessert, a cup 61 for drinks and dishes 70 for a main dish (hot dish) are placed on the tray 30. For the flatware 70 for the hot dish, a container with a lid is used to keep it hot. The dishes 70 are placed on the underlay type heater 40 installed on the tray 30.

For the cooling function, a cool air flowpassage is secured between the tray 30 and the front door and rear door 4. Cool air of natural convection generated by the dry ice 11 placed on the shelf plate 10 on the uppermost stage flows down between the front door 3 and rear door 4 and the tray 30 to keep dishes or the like placed on all the trays 30 cool at optimum temperature for a long period of time.

As for the heating function, when the power source connector 9 is connected to the power source, electricity is supplied from the base plate 6 to the conductive member of the electricity supply device 50 so that the heat generating plate 41 is heated through the contact 44 from the curved portion 54a of the plate spring 54. At this time, the curved portion 54a of the plate spring 54 positively resiliently comes into contact with the contact 44 due to the resiliency of the plate spring 54, and the curved portion 54a is not deformed from the pressing force due to the presence of the convex portion 54b. The ground point also becomes positive. The lower surface of the heat generating plate 41 is sufficiently heat insulated, and a clearance is provided in the tray 30. Therefore, if energization is made under the cooling atmosphere, only the container with a lid will be heated without heating the trays 30 or the cooled food provided in other dishes.

While a support plate is necessary in the receiving chamber, it is to be noted that the electricity supply device is provided on the support members on the left and right side walls so that trays are arranged to left and right lengthwise, with which arrangement, the quantity of trays received can be further increased.

As described above, according to the present invention, only dishes required to be kept hot can be locally heated while keeping the interior of the receiving chamber at a given temperature by cooling air. Therefore, the hot dish and the cold dish can be carried in the hot and cold states, respectively, to the desired place. Furthermore, even if the power source is in an ON state, energization is not made unless a heater is placed on the tray and a no-load operation will not occur (i.e., no heating can occur without a heater 40 present). Furthermore, the electricity supply device 50, except the conductive pin 55 and plate spring 54, is integrally molded of synthetic resin, and therefore simple in fabrication. In addition, the conductive members are collectively received into the conductive receiving recess 53 and therefore, an assembly thereof is easy. Moreover, the connection of the electricity supply device to the heater is accomplished by the curved portion of the plate spring, and therefore, the connection range is wide and secured.

Furthermore, the interior of the cart can be cleaned while the electricity supply device 50 is mounted, thus making cleaning control easy and always rendering hygienic use possible.

I claim:

1. A cart comprising:
    a body formed with a receiving chamber for receiving trays on which flatware is placed;
    support members for supporting and guiding trays formed in plural stages on both side walls of said receiving chamber;
    an electricity supply device connected to a power source provided at an upper part of said support member, said trays each having a heater placed thereon and having an electric contact connected to said electricity supply device, said electricity supply device including
        a casing formed integral with
            a conductive member receiving recess, and
            a mounting plate, which mounts said electricity supply device to said side wall of the receiving chamber,
        a plastic mold formed from an insulating member fitted in said conductive member receiving recess, and
        a conductive member including
            a conductive pin connected to a power source, said conductive member being embedded in said plastic mold, and
            a conductive plate spring having one end connected to said conductive pin and another end formed into a curved portion as a curved surface.

2. A cart according to claim 1, wherein ends of said conductive plate spring in said electricity supply device and the curved portion of said plate spring are exposed from said plastic mold.

3. A cart according to claim 1, wherein when the tray with said heater placed thereon is supported and guided by said support members, and received into the receiving chamber, the curved portion of the conductive plate spring of said electricity supply device comes into resilient contact with a contact of said heater.

4. A cart according to claim 1, wherein at least one said electricity supply device is disposed with respect to said support member in a first stage.

5. A cart according to claim 1, wherein a base plate having an electric circuit connected to a power source is disposed on the side wall of said receiving chamber.

* * * * *